United States Patent
Chen et al.

(10) Patent No.: US 7,904,653 B2
(45) Date of Patent: Mar. 8, 2011

(54) DISK ORDER EXAMINATION SYSTEM FOR DUAL-CONTROLLER REDUNDANT STORAGE SYSTEM AND METHOD THEREOF

(75) Inventors: Chih-Wei Chen, Taipei (TW); Hsiao-Fen Lu, Taipei (TW)

(73) Assignee: Inventec Corporation, Taipei (TW)

( * ) Notice: Subject to any disclaimer, the term of this patent is extended or adjusted under 35 U.S.C. 154(b) by 470 days.

(21) Appl. No.: 12/140,644

(22) Filed: Jun. 17, 2008

(65) Prior Publication Data

US 2009/0254703 A1 Oct. 8, 2009

(30) Foreign Application Priority Data

Apr. 3, 2008 (TW) .................... 97112191 A

(51) Int. Cl.
*G06F 12/00* (2006.01)
*G06F 11/00* (2006.01)

(52) U.S. Cl. ............... 711/114; 714/30; 714/42
(58) Field of Classification Search .............. None
See application file for complete search history.

(56) References Cited

U.S. PATENT DOCUMENTS

| 5,615,335 A * | 3/1997 | Onffroy et al. ............. 714/30 |
| 5,975,738 A * | 11/1999 | DeKoning et al. ............. 700/79 |
| 6,754,853 B1 * | 6/2004 | DeKoning et al. ............. 714/42 |
| 7,506,127 B2 * | 3/2009 | Reger et al. ............. 711/170 |
| 2007/0168609 A1 * | 7/2007 | Ali ............. 711/114 |
| 2008/0195581 A1 * | 8/2008 | Ashmore et al. ............. 707/3 |

* cited by examiner

*Primary Examiner* — Kaushikkumar Patel
(74) *Attorney, Agent, or Firm* — CKC&Partners Co., Ltd.

(57) ABSTRACT

A disk order examining system for a dual-controller redundant storage device and method thereof, implementing in a dual-controller redundant device with a master controller and a slave controller. Examining if the linkage orders of the disks to the master controller are the same as those of the slave controller by sequentially writing random values into each disk of a disk concatenation, and then reading out to discriminate their sequence.

14 Claims, 2 Drawing Sheets

DISK ORDER EXAMINATION SYSTEM FOR DUAL-CONTROLLER REDUNDANT STORAGE SYSTEM AND METHOD THEREOF

RELATED APPLICATIONS

This application claims priority to Taiwan Application Serial Number 97112191, filed Apr. 3, 2008, which is herein incorporated by reference.

BACKGROUND

1. Field of Invention

The present invention relates to a disk order examining system for a dual-controller redundant storage device and method thereof. More particularly, the present invention relates to a system and method for determining the linking orders of disks in a dual-controller redundant storage device.

2. Description of Related Art

Concatenation or Spanning of disks is a popular method for combining multiple physical disk drives into a single virtual disk. Concatenation may be thought of as the reverse of partitioning. Whereas partitioning takes one physical drive and creates two or more logical drives, JBOD uses two or more physical drives to create one logical drive. Concatenation is sometimes used to turn several odd-sized drives into one larger useful drive. For example, JBOD could combine 3 GB, 15 GB, 5.5 GB, and 12 GB drives into a logical drive at 35.5 GB, which is often more useful than the individual drives separately. Though, the controller of JBOD treats each drive as a stand-alone disk and each drive is an independent logical drive, JBOD does not provide data redundancy.

Therefore, if the data storage should be ensured, JBOD is applied in a dual-controller redundant storage device with a master controller and a slave controller of a mutual backing up function. That is, the multiple disks are linked to the master controller and the slave controller in respective orders to form a JBOD. One disk after another of the multiple disks are linked to the master controller with one linking order, and also linked to the slave controller with another linking order. If the linking order of one of the disks to the master controller is not consistent with that to the slave controller, errors occur when data is accessed. Therefore the master controller and the slave controller cannot provide a mutual backing up function under this condition.

SUMMARY

For this reason, this invention provides a disk order examining system for a dual-controller redundant storage device and method thereof, applied in a storage device with a master controller and a slave controller. The master controller sequentially writes random numbers into every disk in the disk concatenation, and the slave controller then sequentially reads out the random numbers from the disks in the disk concatenation. By comparing the orders of those two random number sequences, the system determines whether the linking order of the disks to the master controller is consistent with the linking order of the disks to the slave controller or not.

The linking order examining technique of this invention is implemented with the disks in the disk concatenation linked to the master controller as a first configuration. Therefore, the random numbers written into the disks are written in a number sequence in the first configuration order. And the disks in the disk concatenation also link to the slave controller as a second configuration. Therefore, the random numbers read out from the disks is the number sequence in the second configuration order. Then, by comparing the random number sequence in the second configuration order with the random number sequence in the first configuration order, the system can determine whether the linking order of the disks to the master controller is consistent with the linking order of the disks to the slave controller or not.

The invention provides a disk order examining system for a dual-controller redundant storage device, comprising: a disk concatenation having a plurality of disks for data access; a master controller linking to the disks of the disk concatenation in a first configuration and accessing data to the disk concatenation; a slave controller linking to the disks of the disk concatenation in a second configuration and accessing data to the disk concatenation for backing up the master controller; a data write-in module disposed in the master controller, generating a plurality of random numbers and writing the random numbers into the disks in sequence; and an examining module disposed in the slave controller, reading out the random numbers from the disks and determining whether the first configuration is consistent with the second configuration or not.

The invention provides a disk order examining method for a dual-controller redundant storage device, comprising following steps: (a) generating a plurality of random numbers by a master controller; (b) writing the random numbers in a first configuration order into a disk concatenation by the master controller; (c) sending the random numbers to a slave controller; (d) reading out the random numbers in a second configuration order from the disk concatenation by the slave controller; and (e) determining if the second configuration is consistent with the first configuration.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
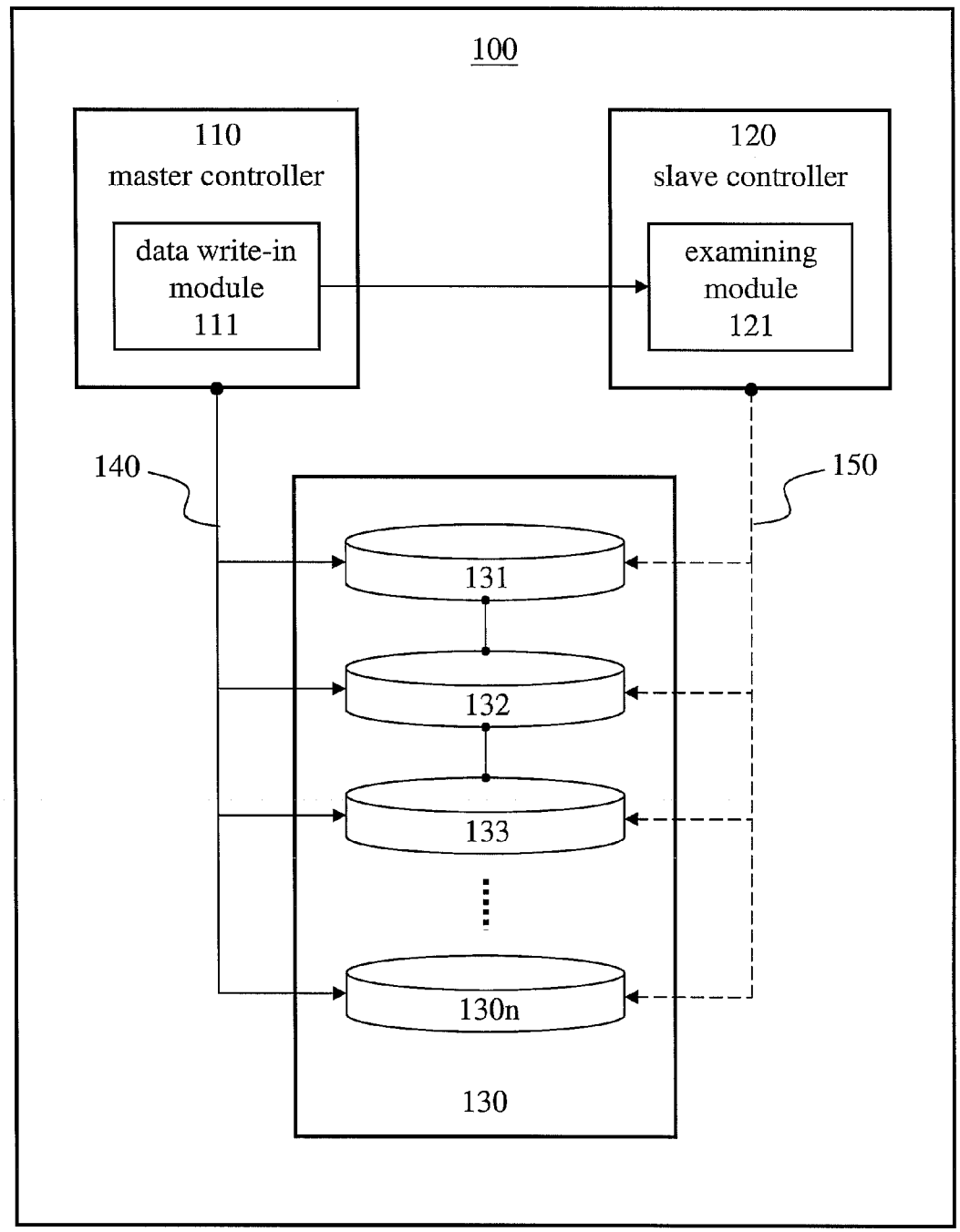
FIG. 1 is the block diagram of the preferred embodiment of the disk order examining system for a dual-controller redundant storage device of this invention.

Reference will now be made in detail to the present embodiments of the invention, examples of which are illustrated in the accompanying drawings. Wherever possible, the same reference numbers are used in the drawings and the description to refer to the same or like parts.

Refer to FIG. 1. FIG. 1 is the block diagram of the preferred embodiment of the disk order examining system for a dual-controller redundant storage device of this invention. As shown in FIG. 1, the disk order examining system 100 of this invention is applied in a dual-controller redundant storage device comprising a master controller 110, a slave controller 120 and a disk concatenation 130. The master controller 110 and the slave controller 120 are central controllers with the master-slave relation according to a predetermined regulation of the dual-controller redundant storage device. The disk concatenation 130 combines multiple disks, 131.about.130n, into a single virtual disk as the JBOD (Just a Bunch of Drives), wherein all the disks 131.about.130n link to both the master controller 110 and the slave controller 120, and respectively provide the master controller 110 and the slave controller 120 for accessing data. The disks 131.about.130n the disk concatenation 130 are linked to the master controller 110 in the sequence of the first configuration 140. The disks 131.about.130n are also linked to the slave controller 120 in the sequence of the second configuration 150. Moreover, the master controller 110 comprises a data write-in module 111 which generates a plurality of random numbers and sequentially writes the random numbers into the disks 131.about.130n. The slave controller 120 comprises an examining module 121 which sequentially reads out the random numbers from the disks 131~130n and examines whether the first configuration 140 is consistent with the second configuration 150 or not.

The above-mentioned master controller 110 sequentially writes the random numbers into the disks 131.about.130n by data write-in module 111. Therefore, the random numbers have the sequence of the first configuration 140 and are written into the disks 131.about.130n in the sequence of the first configuration 140. The data write-in module 111 then sends the generated random numbers to the examining module 121 to be the basis of the comparison afterwards. The slave controller 120 then sequentially reads out the random numbers from the disks 131.about.130n with the examining module 121. Therefore, the read out random numbers have the sequence of the second configuration 150. The examining module 121 in the slave controller 120 can determine whether the second configuration 150 is consistent with the first configuration 140 or not by comparing the random number sequence order in the second configuration 150 with the random number sequence order in the first configuration 140. If the second configuration 150 is not consistent with the first configuration 140 that means, the linking order of the disks 131~130n to the master controller 110 is inconsistent with the linking order of the disks 131.about.130n to the slave controller 120. Therefore, the slave controller 120 should cease the backup function for the master controller 110.

Figure 2:
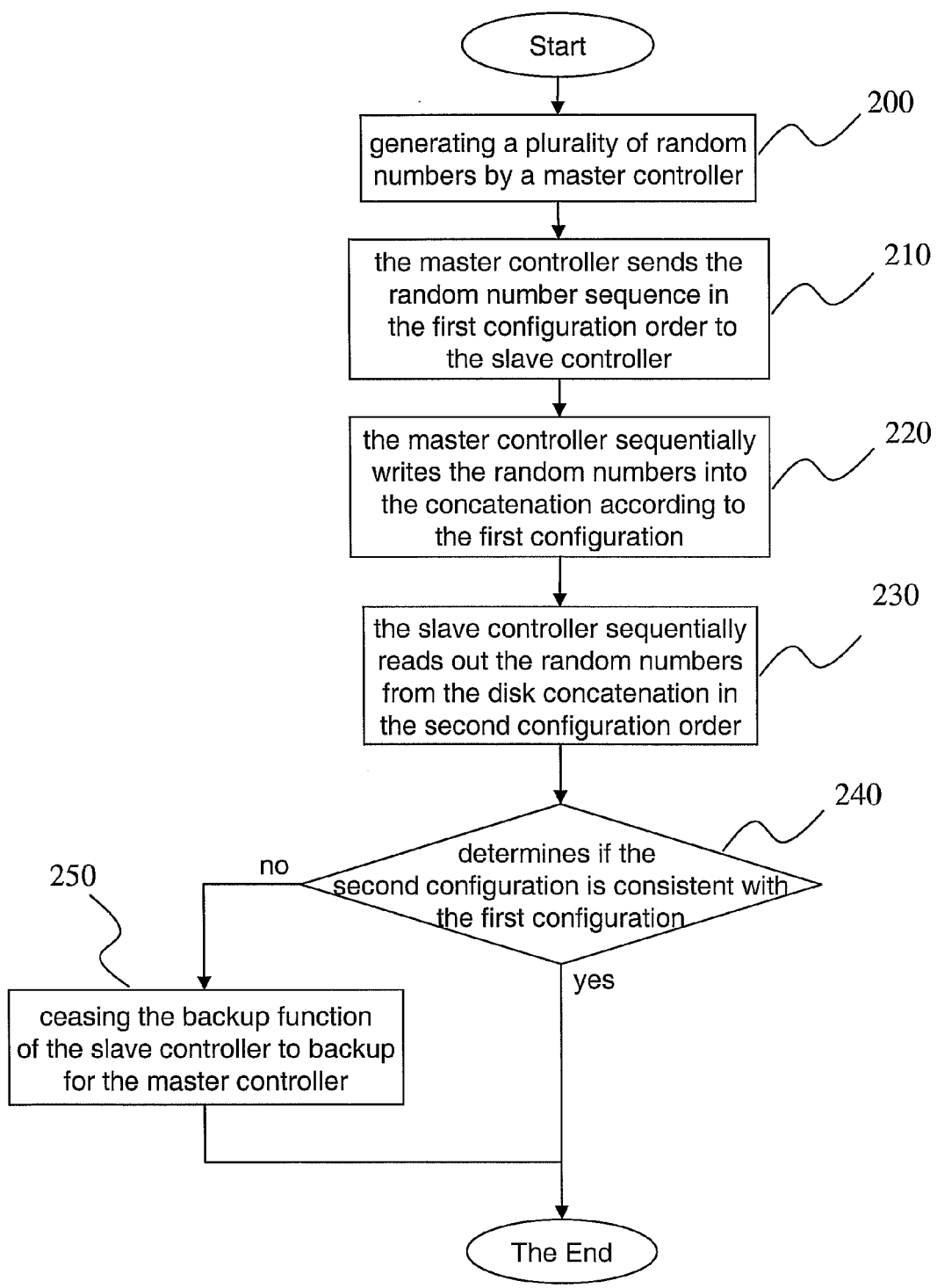
FIG. 2 is the flowchart illustrating steps of the disk order examining method for a dual-controller redundant storage device of this invention.

Refer to FIG. 2. FIG. 2 is the flowchart illustrating the steps of the disk order examining method for a dual-controller redundant storage device of this invention. As shown in FIG. 2, first, a master controller 110 generates a plurality of random numbers (Step 200). Then the master controller 110 sends the random number sequence order in the first configuration 140 to the slave controller 120 (Step 210). Then the master controller 110 sequentially writes the random numbers into the concatenation 130 according to the first configuration 140 (Step 220). After the random numbers are written into the concatenation 130, the slave controller 120 sequentially reads out the random numbers from the disk concatenation 130 in the second configuration 150 order (Step 230). Therefore, a random number sequence order having the second configuration 150 is obtained. Then, the examining module 121 determines if the second configuration 150 is consistent with the first configuration 140 (Step 240), by comparing the random number sequence order in the second configuration 150 with the random number sequence order in the first configuration 140. If the second configuration 150 is determined to be inconsistent with the first configuration 140 in Step 240, that means, the linking order of disks 131~130n to the master controller 110 is inconsistent with the linking order of the disks 131~130n to the slave controller 120. If the dual-controller redundant storage device still operates under the condition as the master controller and the slave controller backup for each other, the data accessing will result in errors and cause damage or loss of information. Therefore, the backup function of the slave controller 120 to backup for the master controller 110 must be ceased (Step 250). And all the tasks in the dual-controller redundant storage device should be temporarily taken over by the master controller 110 until the linking order of disks 131~130n to the master controller 110 and to the slave controller 120 is rearranged. By this invention, the stability of data accessing in the dual-controller redundant storage device is ensured.

Although the present invention has been described in considerable detail with reference certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A disk order examining system for a dual-controller redundant storage device, comprising:
   a disk concatenation having a plurality of disks for data access;
   a master controller linking the plurality of disks of the disk concatenation in a first configuration order and accessing data according to the disk concatenation;
   a slave controller linking the plurality of disks of the disk concatenation in a second configuration order and accessing data according to the disk concatenation for backing up the master controller;
   a data write-in module disposed in the master controller generating a plurality of random numbers and writing the plurality of random numbers into the plurality of disks in sequence as the plurality of disks linked to the master controller;
   an examining module disposed in the slave controller reading out the plurality of random numbers from the plurality of disks in sequence as the plurality of disks linked to the slave controller and determining whether the first configuration order is consistent with the second configuration order or not; and
   wherein the examining module ceasing backup function of the slave controller to backup the master controller, when the examining module determines the second configuration order is inconsistent with the first configuration order.

2. The disk order examining system of claim 1, wherein the disk concatenation combines multiple disks into a single virtual disk as a JBOD (Just a Bunch of Drives).

3. The disk order examining system of claim 1, wherein the plurality of disks are physical disk drives.

4. The disk order examining system of claim 1, wherein the data write-in module further sends the generated plurality of random numbers to the examining module.

5. The disk order examining system of claim 1, wherein the plurality of random numbers which are written into the plurality of disks have same order as the first configuration order.

6. The disk order examining system of claim 5, wherein the plurality of random numbers which are read out from the plurality of disks have the same order as the second configuration order.

7. The disk order examining system of claim 6, wherein the examining module compares the plurality of random numbers in the second configuration order with the plurality of random numbers in the first configuration order to determine if the second configuration is consistent with the first configuration.

8. A disk order examining method for a dual-controller redundant storage device, comprising following steps:
generating a plurality of random numbers by a master controller;
writing the plurality of random numbers in a first configuration order into a disk concatenation by the master controller;
sending the plurality of random numbers to a slave controller;
reading out the plurality of random numbers in a second configuration order from the disk concatenation by the slave controller;
determining by an examination module if the second configuration order is consistent with the first configuration order; and
ceasing backup function of the slave controller to backup for the master controller when the examining module determines the second configuration order is inconsistent with the first configuration order.

9. The disk order examining method of claim 8, wherein the disk concatenation combines multiple disks into a single virtual disk as a JBOD (Just a Bunch of Drives).

10. The disk order examining method of claim 9, wherein the multiple disks are physical disk drives.

11. The disk order examining method of claim 9, wherein the multiple disks are linked to both the master controller and the slave controller, respectively providing the master controller and the slave controller for accessing data.

12. The disk order examining method of claim 9, wherein the first configuration order refers to a linking sequence of all disks in the disk concatenation to the master controller.

13. The disk order examining method of claim 9, wherein the second configuration order refers to the linking sequence of all disks in the disk concatenation to the slave controller.

14. The disk order examining method of claim 8, wherein the step of determining if the second configuration order is consistent with the first configuration order is applied by comparing the plurality of random numbers in the second configuration order with the plurality of random numbers in the first configuration order.

* * * * *